US006800663B2

(12) United States Patent
Asgarzadeh et al.

(10) Patent No.: US 6,800,663 B2
(45) Date of Patent: Oct. 5, 2004

(54) CROSSLINKED HYDROGEL COPOLYMERS

(75) Inventors: Firouz Asgarzadeh, Hillsborough, NJ (US); Henry R. Costantino, Newton, MA (US)

(73) Assignee: Alkermes Controlled Therapeutics Inc. II,, Cambridge, MA (US)

( * ) Notice: Subject to any disclaimer, the term of this patent is extended or adjusted under 35 U.S.C. 154(b) by 0 days.

(21) Appl. No.: 10/273,365

(22) Filed: Oct. 18, 2002

(65) Prior Publication Data

US 2004/0077797 A1 Apr. 22, 2004

(51) Int. Cl.$^7$ .................... B01J 13/18; C08G 63/08; C08J 3/26
(52) U.S. Cl. .................. 516/108; 424/436; 424/501; 514/772.1; 514/772.2; 516/102; 524/604; 525/59; 525/404; 525/445; 525/450
(58) Field of Search .................. 424/436, 501; 514/772.1, 772.2, 772.3; 516/102, 108; 524/599, 601, 604; 525/59, 404, 445, 450

(56) References Cited

U.S. PATENT DOCUMENTS

| | | | |
|---|---|---|---|
| 3,065,213 A | 11/1962 | Vandenberg | 260/83.3 |
| 3,737,337 A | 6/1973 | Schnoring et al. | 117/100 |
| 3,907,718 A | 9/1975 | Hall et al. | 252/522 |
| 4,195,167 A | 3/1980 | Knopf et al. | 525/408 |
| 4,389,330 A | 6/1983 | Tice et al. | 427/213.36 |
| 4,644,038 A | 2/1987 | Protzman | 525/412 |
| 4,745,171 A | 5/1988 | Sato et al. | 528/116 |
| 4,804,663 A | 2/1989 | Kennis et al. | 514/258 |
| 5,019,400 A | 5/1991 | Gombotz et al. | 424/897 |
| 5,158,952 A | 10/1992 | Janssen et al. | 514/258 |
| 5,340,849 A | 8/1994 | Dunn et al. | 523/113 |
| 5,359,026 A | 10/1994 | Gruber | 528/354 |
| 5,407,609 A | 4/1995 | Tice et al. | 264/46 |
| 5,429,826 A * | 7/1995 | Nair et al. | 424/501 |
| 5,525,702 A | 6/1996 | Nace | 528/354 |
| 5,608,034 A | 3/1997 | Falling et al. | 528/409 |
| 5,626,863 A | 5/1997 | Hubbell et al. | 424/426 |
| 5,639,413 A | 6/1997 | Crivello | 264/401 |
| 5,650,173 A | 7/1997 | Ramstack et al. | 424/489 |
| 5,654,008 A | 8/1997 | Herbert et al. | 424/489 |
| 5,702,717 A | 12/1997 | Cha et al. | 424/425 |
| 5,718,921 A | 2/1998 | Mathiowitz et al. | 424/497 |
| 5,792,477 A | 8/1998 | Rickey et al. | 424/501 |
| 5,797,898 A | 8/1998 | Santini, Jr. et al. | 604/890.1 |
| 5,817,343 A | 10/1998 | Burke | 424/489 |
| 5,837,752 A | 11/1998 | Shastri et al. | 523/116 |
| 5,844,016 A | 12/1998 | Sawhney et al. | 322/13 |
| 5,874,064 A | 2/1999 | Edwards et al. | 424/46 |
| 5,902,599 A | 5/1999 | Anseth et al. | 424/426 |
| 5,916,598 A | 6/1999 | Rickey et al. | 424/501 |
| 5,922,253 A | 7/1999 | Herbert et al. | 264/5 |
| 5,945,126 A | 8/1999 | Thanoo et al. | 424/489 |
| 5,968,542 A | 10/1999 | Tipton | 424/423 |
| 5,989,463 A | 11/1999 | Tracy et al. | 264/4.1 |
| 6,004,573 A | 12/1999 | Rathi et al. | 424/426 |
| 6,051,248 A | 4/2000 | Sawhney et al. | 424/426 |
| 6,103,255 A | 8/2000 | Levene et al. | 424/426 |
| 6,110,503 A | 8/2000 | Rickey et al. | 424/501 |
| 6,136,295 A | 10/2000 | Edwards et al. | 424/45 |
| 6,143,314 A | 11/2000 | Chandrashekar et al. | 424/426 |
| 6,153,211 A | 11/2000 | Hubbell et al. | 424/426 |
| 6,160,084 A | 12/2000 | Langer et al. | 528/272 |
| 6,183,781 B1 | 2/2001 | Burke | 424/486 |
| 6,201,065 B1 | 3/2001 | Pathak et al. | 525/90 |
| 6,221,977 B1 | 4/2001 | Park et al. | 525/408 |
| 6,235,224 B1 | 5/2001 | Mathiowitz et al. | 264/4 |

FOREIGN PATENT DOCUMENTS

| | | |
|---|---|---|
| JP | 61-192730 A A1 | 8/1986 |
| JP | 61-192730 A * | 8/1986 |
| JP | 06 084203 | 3/1994 |
| JP | 09-194565 A | 7/1997 |

OTHER PUBLICATIONS

Jun–Kang, Liu, et al., "Reactions of Silyl Ketene Acetal––Functionalized Polysiloxanes. Synthesis of Sulfonated Polysiloxanes," Macromolecules, 27: 4080–4083 (1994).

Byeongmoon, Jeong, et al., "Thermogelling Biodegradable Polymers with Hydrophilic Backbones: PEG–g–PLGA," Macromolecules 33: 8317–8322 (2000).

* cited by examiner

*Primary Examiner*—Robert Sellers
(74) *Attorney, Agent, or Firm*—Andrea G. Reister; Covington & Burling

(57) ABSTRACT

The present invention relates to crosslinked polymers, synthesized through ring-opening polymerization of ethylenically unsaturated epoxides, in combination with α-hydroxy acids using a hydrophilic macroinitiator, such as poly (ethylene glycol), to form substituted copolymers having ethylenically unsaturated functionality randomly distributed along the polyester polymer backbone. That copolymer is subsequently crosslinked to form a hydrogel network. More particularly, the present invention relates to the synthesis of biodegradable poly(α-hydroxy acid-co-glycidyl methacrylate)-block-poly(ethylene glycol)-block-poly(α-hydroxy acid-co-glycidyl methacrylate) copolymers, which are subsequently crosslinked to form hydrogel networks. The invention also relates to the use of these hydrogel networks in various applications, in particular, for the controlled release of drugs and proteins.

35 Claims, 3 Drawing Sheets

$^1$H-NMR OF SAMPLE 1

FIG. 1 (a)

$^1$H-NMR OF SAMPLE 2A

FIG. 1 (b)

$^1$H-NMR OF SAMPLE 2B

FIG. 1 (c)

$^1$H-NMR OF SAMPLE 6

CROSSLINKED HYDROGEL COPOLYMERS

BACKGROUND OF THE INVENTION

1. Field of the Invention

The present invention relates to the synthesis of crosslinked polymers. More particularly, the present invention relates to biodegradable crosslinked hydrogel copolymers.

2. Related Art

Interest in the synthesis of new degradable polymers has expanded in recent years. The increased interest in the synthesis of new degradable polymers stems in part from the use of synthetic polymers in medical applications. In many medical applications, it is advantageous that the polymer be able to degrade and that the degradation products also must be compatible with the human body, i.e., be nontoxic. In this situation, the polymers are termed biodegradable, indicating their ability to degrade due to biological processes occurring inside the human body. As early as the 1960s, synthetic polymers were used in the field of surgical medicine as suture material. The polymeric suture material was both biodegradable and absorbable, that is, the polymers decomposed after a period of time after implantation in the human body, and those decomposition products were absorbed by the human body without any adverse or toxic effects.

In addition to use as suture material, degradable polymers have been used in other biomedical applications, such as polymer-based drug delivery systems. In such a system, degradable polymers are used as a matrix for the controlled or sustained delivery or release of biologically active agents, such as protein drugs, to the human body. In addition, the development of endoscopic surgical techniques has resulted in the need for developing such degradable drug delivery systems wherein the placement of the drug delivery device is targeted for specific anatomical locations. Examples of such polymer-based drug delivery systems are described in the following U.S. patents: U.S. Pat. No. 6,183,781, entitled "Method for Fabricating Polymer-based Controlled-release Devices"; U.S. Pat. No. 6,110,503, entitled "Preparation of Biodegradable, Biocompatible Microparticles Containing a Biologically Active Agent"; U.S. Pat. No. 5,989,463, entitled "Methods for Fabricating Polymer-based Controlled-release Devices"; U.S. Pat. No. 5,916,598, entitled "Preparation of Biodegradable, Biocompatible Microparticles Containing a Biologically Active Agent"; U.S. Pat. No. 5,817,343, entitled "Method for Fabricating Polymer-based Controlled-release Devices"; U.S. Pat. No. 5,650,173, entitled "Preparation of Biodegradable, Biocompatible Microparticles Containing a Biologically Active Agent." Other examples of polymer-based drug delivery systems are described in U.S. Pat. No. 5,922,253, entitled "Production Scale Method of Forming Microparticles" and U.S. Pat. No. 5,019,400, entitled "Very Low Temperature Casting of Controlled Release Microspheres," the technology described therein also known as Prolease®. All of the above-identified patents are assigned to Alkermes Controlled Therapeutics, Inc. of Cambridge, Mass., and are incorporated herein by reference.

Degradable polymers have also been used in other biomedical applications, including use as polymer scaffolds for tissue engineering, and are described in U.S. Pat. No. 6,103,255, for example, incorporated herein by reference. Additional biomedical applications for synthetic biodegradable polymers include use with fracture fixation, for example, as absorbable orthopedic fixation devices, and are described in U.S. Pat. Nos. 5,902,599 and 5,837,752, both of which are incorporated herein by reference. Synthetic biodegradable polymers are also used in dental applications, and are described, for example, in U.S. Pat. No. 5,902,599.

The wide variety of biomedical applications just described for synthetic biodegradable polymers demonstrates the need for the development of different types of polymers with varying physical properties for use in various biomedical applications.

Synthetic degradable absorbable polymers already developed to date for use in biomedical applications include, for example, poly(p-dioxanone), which is an alternating ether-ester polymer, and its copolymers; polycaprolactone; polyhydroxyalkanoates; poly(propylene fumarate); poly(ortho esters); other polyesters including poly(block-ether esters), poly(ester amides), poly(ester urethanes), polyphosphonate esters, and polyphosphoesters; polyanhydrides; polyphosphazenes; poly(alkylcyanoacrylates); and polyacrylic acids, polyacrylamides, and their hydrogels. These synthetic absorbable polymers are discussed in detail in *Handbook of Biodegradable Polymers*, edited by Domb, Kost, and Wiseman (Harwood Academic Pub. 1997), incorporated herein by reference.

In addition, synthetic polymers based on the polymerization of caprolactone, lactic acid, and glycolic acid have become mainstays in the field of degradable polymers, in particular the field of degradable polyesters, and are available commercially. Caprolactone is the cyclic ester derivative of hydroxy caproic acid, $HO(CH_2)_5CO_2H$, and can be ring-opened to form the polyester poly(caprolactone), —[O$(CH_2)_5CO_2$]—. It should be noted that caprolactone has two structural isomers, designated $\epsilon$- and $\delta$-caprolactone. Any discussion of caprolactone generally applies to both forms, unless specifically noted.

Polylactide, polyglycolide, and the copolymers of lactide with glycolide are known for their applications as biodegradable polymers because of their proven biocompatibility and versatile degradation properties. Lactic acid- and glycolic acid-based polymers with high molecular weights are not obtained through direct condensation of the corresponding carboxylic acid due to reversibility of the condensation reaction, backbiting reactions, and the high degree of conversion required. Rather, lactic acid- and glycolic acid-based polymers are typically obtained by ring-opening polymerization of the corresponding diester dimers, lactide and glycolide, respectively, themselves. Alternatively, the reaction can be carried out as a condensation of lactic and glycolic acid. The resulting polymers of these polymerization reactions are poly(lactic acid), also referred to as poly(lactide), abbreviated PLA and poly(glycolic acid), also referred to as poly(glycolide), abbreviated PGA. Copolymers incorporating both monomers are also available and are termed poly(lactide-co-glycolides) abbreviated PLGA and poly(glycolide-co-lactides) abbreviated PGLA, or collectively PLGs. U.S. Pat. No. 5,650,173, incorporated herein by reference, describes examples of these commercially available polymers and copolymers based on lactic acid and glycolic acid. It should be noted that lactide has two structural isomers, denoted D and L. Any discussion of lactide generally is referring to a racemic mixture of both isomers, i.e., D,L-lactide, abbreviated DLLA, unless specifically noted.

All of these polymers and copolymers derived from caprolactone, lactic and glycolic acid contain ester linkages in the backbone of the polymer chain. The presence of this ester linkage provides the necessary functionality to permit degradability, particularly biodegradability in the human body. As opposed to other linkages, such as amides, which require severe conditions in order to decompose, the ester linkage undergoes hydrolysis under even mildly basic conditions such as those found in vivo. In contrast, the amide linkage requires more stringent conditions and is not easily hydrolyzed even under strongly acidic or basic conditions. In vivo, the only available route for cleavage of an amide bond is enzymatic, and that cleavage is often specific to the amino acid sequence. The highly crystalline nature of polyamides, e.g., nylon, further slows degradation by preventing or blocking access to the amide bond by water molecules and enzymes.

While these polymers based on lactide, glycolide, and/or caprolactone offer advantages in degradability as just discussed, they also suffer from the disadvantage that they are hydrophobic, i.e., they do not readily absorb or take up water molecules. For example, polylactide has a very low water uptake of about 5 weight percent due to its high hydrophobicity. As a result, their applicability for use as drug delivery systems and compatibility with living systems can be limited.

One polymer system that is compatible with living systems and does readily absorb water is the hydrogels. Hydrogels are three-dimensional networks, composed of homopolymers or copolymers, that are capable of absorbing large amounts of water or biological fluids. A characteristic of hydrogels is that they swell in water without dissolving. Their high water content and soft consistency make hydrogels similar to natural living tissue more than any other class of synthetic biomaterials. Thus, hydrogels have found numerous applications especially in medical and pharmaceutical sectors. Hydrogels have been investigated widely as drug carriers due to their adjustable swelling capacities, which permit flexible control of drug release rates.

However, hydrogel networks are generally insoluble due to the presence of chemical crosslinks (i.e., nodes or junctions) or of physical crosslinks (i.e., entanglements). As a result, most hydrogels are not biodegradable, which limits their clinical use in the human body. Examples of nonbiodegradable hydrogels include poly(N-isopropyl acrylamide), poly(hydroxy ethylmethacrylate), poly(vinyl alcohol), poly(acrylic acid), polyethylene glycol diacrylate, polyethylene glycol dimethacrylate, and combinations thereof. Incorporation of chemically hydrolyzable or biochemically cleavable groups into the polymer network structure is one of the methods used to prepare biodegradable hydrogels. Examples of such hydrogels are described in U.S. Pat. No. 5,626,863, issued to Hubbell et al., entitled "Photopolymerizable Biodegradable Hydrogels as Tissue Contacting Materials and Controlled-Release Carriers"; U.S. Pat. No. 5,844,016, issued to Sawhney et al., entitled "Redox and Photoinitiator Priming for Improved Adherence of Gels to Substrates"; U.S. Pat. No. 6,051,248, issued to Sawhney et al., entitled "Compliant Tissue Sealants"; U.S. Pat. No. 6,153,211, issued to Hubbell et al., entitled "Biodegradable Macromers for the Controlled Release of Biologically Active Substances"; U.S. Pat. No. 6,201,065, issued to Pathak et al., entitled "Multiblock Biodegradable Hydrogels for Drug Delivery and Tissue Treatment"; U.S. Pat. No. 6,201,072, issued to Rathi et al, entitled "Biodegradable Low Molecular Weight Triblock Poly(lactide-co-glycolide) Polyethylene Glycol Copolymers Having Reverse Thermal Gelation Properties." All of the aforementioned patents are incorporated herein by reference. Nevertheless, the nonbiodegradability of hydrogel networks remains an obstacle in the further development of using hydrogels in biomedical applications, in particular, drug delivery systems.

Thus, while hydrogels are advantageously hydrophilic, they are disadvantageously difficult to biodegrade. Conversely, while polymers based on lactide and/or glycolide are advantageously biodegradable, they are disadvantageously hydrophobic.

In order to address the hydrophobicity of the polymers based solely on caprolactone, lactic acid and glycolic acid, degradable polymers can be synthesized in which additional monomer units are incorporated into the backbone of poly (caprolactone), PLA, PGA, or PLGs. In particular, copolymerization with preformed polymers having a hydrophilic segment can be used. Such hydrophilic segments include any number of segments based on diol- or glycol- containing linkages, for example, polyethylene glycol (PEG), also known as polyethylene oxide (PEO), polypropylene oxide (PPO), and pluronics. The resulting copolymers, thus include lactide and/or glycolide monomer units along with the polyether hydrophilic core initiating segment as a single block in the backbone of the polymer. For example, a PEG with molecular weight of 600 would consist of a block of at least 13 monomer units. Other polymers have multiple large segments or blocks of PEG alternating with blocks of a polyester. For example, Polyactive® is a copolymer that has large blocks of PEG alternating with blocks of poly(butylene terephthalate).

Other examples of lactide-based polymers that include a hydrophilic segment include the following: U.S. Pat. Nos. 4,526,938 and 4,745,160 to Churchill et al. disclose the synthesis of polylactide block copolymers with poly (ethylene glycol) or pluronics, in which the molecular weights of the hydrophilic segments are more than 5000 Daltons. U.S. Pat. No. 5,702,717 to Cha et al. and U.S. Pat. No. 6,117,949 to Ramesh et al. report thermogelling polymers of the same type with molecular weights of the hydrophilic segments (i.e., PEG) lower than 5000 Daltons. Subsequently, PCT/US00/32130 (WO 01/41735) to Shah et al. discloses the synthesis of polymers based on triblock copolymers of low molecular weight pluronics with PLGA. All of the foregoing patents and published patent applications are incorporated herein by reference. All of the polymers disclosed in these patents, while having improved hydrophilicity due to the presence of PEG or pluronics, are nevertheless linear polymers containing only physical, rather than chemical, crosslinks. Such physical crosslinks are due to the interaction between chains of the polymer and the different parts of the polymer's building blocks. The lack of chemical crosslinks between polymer chains may limit the formation of a variety of three-dimensional networks that could advantageously be manipulated for use in drug delivery systems and other applications where control of water content is important.

Crosslinking linear polymer chains is frequently accomplished through the introduction of an additional block in the copolymer backbone that has functionality capable of reacting chemically with functionality on another linear polymer chain. Epoxides, i.e., molecules containing the oxirane functionality, i.e., a three-membered C—O—C ring, are known to undergo ring-opening polymerization reactions in the same manner and under the same conditions as the ring-opening polymerization of cyclic esters, i.e., lactide, glycolide, and caprolactone. In particular, the ring-opening polymerization of epoxides takes advantage of the fact that cyclic monomers inherently have associated ring strain, which is inversely proportional to the size of the ring. The greater the ring strain, the less energy required to open the ring, and the milder the reaction conditions necessary to achieve polymerization. Thus, copolymerizing a functionalized epoxide and a cyclic ester incorporates the ring-opened epoxide into the backbone of the linear copolymer. Choice of appropriate functionality on the epoxide may permit subsequent crosslinking of the linear copolymer chains.

One example of using epoxides to produce copolymers is described in U.S. Pat. No. 4,195,167, issued to Knopf et al., entitled "Gradient Polymers of Two or More Cyclic, Organic, Ring-Opening, Addition Polymerizable Monomers and Methods for Making Same." This patent, incorporated herein by reference, describes the formation of copolymers of ethylene oxide and propylene oxide using a basic catalyst, e.g., potassium hydroxide, at temperatures above 100° C.

Another example of using epoxides to produce copolymers is described in U.S. Pat. No. 6,221,977, issued to Park et al., entitled "Biodegradable Aliphatic Polyester Grafted with Polyether and a Process for Preparing the Same." This patent, incorporated herein by reference, describes the formation of grafted polymers wherein an epoxide, i.e., epichlorohydrin, is reacted with polyethyleneglycolmethylether (PEGME), to form an epoxide substituted with a polyether linkage. That substituted epoxide is then reacted with an ester to form a polyester polymer grafted to a side chain composed of PEGME through an ether linkage.

Another example involving epoxides to produce copolymers is described in an article by Jeong et al., entitled "Thermogelling Biodegradable Polymers with Hydrophilic Backbones: PEG-g-PLGA," in *Macromolecules*, 2000, 33, 8317–22. That article, incorporated herein by reference, describes the sequential synthesis of a copolymer using preformed PEG in the backbone grafted to side chains derived from lactide and glycolide.

Another example where epoxides have been used to form copolymers is described in U.S. Pat. No. 5,359,026, issued to Gruber, entitled "Poly(Lactide) Copolymer and Process for Manufacture Thereof." That patent, incorporated herein by reference, describes copolymerization of lactide with an epoxidized fat or oil, e.g., linseed oil, for the purpose of forming copolymers with improved processing properties. However, the epoxides disclosed in that patent are not functionalized. Moreover, those epoxides are actually multiple epoxides (polyepoxides), rather than monomeric epoxides, when reacted with lactide, requiring temperatures in excess of 180° C.

Another example of copolymerizing epoxides and lactides and/or glycolides is described in U.S. Pat. No. 4,644,038, issued to Protzman, which is incorporated herein by reference. In particular, the epoxide monomers described in this patent contain vinyl groups, i.e., the epoxide monomers are ethylenically unsaturated. In a subsequent reaction, the linear copolymers are crosslinked to form chemical bonds, forming a network. However, while this patent involves the crosslinking of epoxide and lactide/glycolide copolymers, this patent does not address the incorporation of hydrophilic segments into the polymer network in order to affect the ability of that network to absorb water. In particular, none of the crosslinked polymers described therein are hydrogels. Moreover, none of the crosslinked polymers described therein are used in drug delivery systems.

Other examples of including functionality in the polymer backbone to effect crosslinking in a subsequent reaction, i.e., through photocuring, radiation, or by chemical means, other than by incorporating functionalized epoxides, exist. Examples of such crosslinkable polymeric systems are the following: U.S. Pat. No. 5,626,863, issued to Hubbell et al., entitled "Photopolymerizable Biodegradable Hydrogels as Tissue Contacting Materials and Controlled-Release Carriers"; U.S. Pat. No. 5,844,016, issued to Sawhney et al., entitled "Redox and Photoinitiator Priming for Improved Adherence of Gels to Substrates"; U.S. Pat. No. 6,051,248, issued to Sawhney et al., entitled "Compliant Tissue Sealants"; U.S. Pat. No. 6,153,211, issued to Hubbell et al., entitled "Biodegradable Macromers for the Controlled Release of Biologically Active Substances"; U.S. Pat. No. 6,201,065, issued to Pathak et al., entitled "Multiblock Biodegradable Hydrogels for Drug Delivery and Tissue Treatment." All of the aforementioned patents were previously incorporated herein by reference.

In particular, U.S. Pat. No. 5,410,016, issued to Hubbel et al., entitled "Photopolymerizable Biodegradable Hydrogels as Tissue Contacting Materials and Controlled-Release Carriers," and incorporated herein by reference, describes the synthesis of crosslinked hydrogels of polylactide-block-poly(ethylene glycol)-block-polylactide via a three step process. In the first step, polymerization of lactide and/or glycolide was initiated using poly(ethylene glycol) and a stannous octoate catalyst system. In the second step, these block copolymers were end-capped with acryloyl chloride to incorporate unsaturation at the ends of the linear polymer chains. In a third step, these vinyl end-capped polymers were crosslinked. This three-step process is outlined below in Scheme 1, wherein the brackets labeled PLA indicate the lactide backbone of the copolymer.

-continued

This patent describes the incorporation of unsaturated groups in the linear polymer chains by means of reaction of the hydroxyl groups at the chain ends with acrylic acids or chlorides. The result is the presence of ethylenic unsaturation only at the ends of the linear polymer chains. Any subsequent crosslinking reaction will only result in crosslinks at the ends of the linear polymer chains. This provides minimal control over the degree of crosslinking and thus minimal control over the properties of the resulting polymer network, in particular, the ability of the network to absorb water and the ability of the network to act as a drug delivery system. This patent describes neither the incorporation of unsaturated groups into the polymer backbone by using a bifunctional ring-opening polymerizable monomer, such as an ethylenically unsaturated epoxide, nor that that incorporation is random inside the copolymer backbone, thereby creating multiple sites for potential future crosslinking reactions.

Thus, there is a need to develop biodegradable polymer systems, based on ring-opened cyclic esters, that not only contain hydrophilic segments capable of absorbing significant amounts of water, but also contain sufficient functionality to facilitate crosslinking reactions in order to form three-dimensional networks. The present invention, the description of which is fully set forth below, solves the need in the art for development of such biodegradable crosslinked hydrogel networks.

SUMMARY OF THE INVENTION

The present invention provides for the synthesis of various biodegradable copolymers. The copolymers are synthesized through the process of ring-opening polymerization.

In one embodiment of the invention, the copolymers synthesized through the process of ring-opening polymerization are comprised of a ring-opened cyclic ester, a ring-opened ethylenically unsaturated epoxide, and a hydrophilic segment. The ring-opened cyclic ester units contain the requisite ester functionality in the backbone of the polymer to readily permit degradation, in particular biodegradation. The ring-opened ethylenically unsaturated epoxide units are randomly distributed in the polyester backbone and contain unsaturated functionality to permit crosslinking and the formation of three-dimensional networks. The hydrophilic segment is also incorporated in the backbone of the polymer to enhance the hydrophilicity of the copolymer, resulting in a hydrogel network upon crosslinking.

In a further embodiment of the invention, the copolymers comprising a ring-opened cyclic ester, a ring-opened ethylenically unsaturated epoxide, and a hydrophilic segment are subsequently crosslinked, through the unsaturated functionality of the ring-opened epoxide, to form a three-dimensional network. The crosslinking can be accomplished by any known means, e.g., through photocuring, radiation, or by chemical means.

In still another embodiment, the present invention provides for a method of synthesizing biodegradable crosslinked polymer networks by means of a two-step synthesis: the first step is the ring-opening copolymerization of a cyclic ester and an ethylenically unsaturated epoxide in the presence of a hydrophilic segment, such that the ring-opened epoxide is randomly distributed in the polyester backbone; the second step is the crosslinking of the resulting copolymer linear chains. Polymerization in this way permits the incorporation of hydrophilic units into the polyester backbone, in order to impart desirable hydrogel characteristics to the copolymer, and then permits the crosslinking of copolymer chains to form a three-dimensional network. This synthetic procedure results in the synthesis of α-hydroxy, e.g., lactide- and/or glycolide-based, biodegradable hydrogels.

Viewed from another aspect, the present invention provides for the synthesis of biodegradable crosslinked hydrogels that can be used for the controlled delivery of drugs, or any other biologically active agents, i.e., proteins, in a sustained manner. The present invention also provides for the use of such biodegradable crosslinked hydrogels as scaffolds in tissue engineering, tissue replacement, and tissue regeneration, as surgical sealants and tissue sealants for wound repair, as adhesives, and as coatings. The present invention contemplates in vivo as well as ex vivo applications.

Viewed from a further aspect, the present invention provides for mixing the copolymers with active agents before the copolymers are crosslinked. In this aspect of the invention, the copolymers are first mixed with active agents and then injected subcutaneously into a human patient. After injection, the copolymers are crosslinked in situ. One method of in situ crosslinking involves curing with ultraviolet radiation.

Viewed from yet a further aspect, the present invention provides for the preparation of crosslinked microparticles or implantable hydrogels that encapsulate the incorporated active agents.

FEATURES AND ADVANTAGES

The present invention advantageously can be used for the synthesis of biodegradable crosslinked hydrogel polymers heretofore unavailable. The synthetic methods of the present invention are easily adaptable to existing polymer synthesis protocols.

The present invention avoids the hydrophobicity of previous lactide- and/or glycolide-based polymers, while at the same time provides for the biodegradability of the resulting crosslinked hydrogel three-dimensional networks, which networks previously lacked acceptable degradation characteristics.

The present invention also provides for the random incorporation of unsaturated functionality into the polyester backbone of linear polymer chains, rather than merely at the ends of the polymer chains. As the amount of unsaturated functionality directly relates to the amount of subsequent crosslinking, controlling the incorporation of this unsaturation permits greater control over the physical properties of the resulting hydrogel, in particular, the consistency of the gel itself as well as the amount of gel obtained from the crosslinking of the original copolymers.

Moreover, as the quantity and type of hydrophilic segments in the polyester backbone of a linear polymer chain directly relate to the hydrophilicity of any resulting crosslinked polymer network, controlling the incorporation of the hydrophilic segments permits greater control over the physical properties of the resulting hydrogel, in particular, the water content of the gels as well as their equilibrium swelling ratios.

Additionally, because the result of the copolymerization is a polymer backbone that is a derivative of both polyethylene oxide and cyclic esters (i.e., the standard synthesis of degradable polyesters), toxicity issues should be minimal, if not nonexistent.

Also, control over the degree of hydrophilicity and the amount of crosslinking provides for improved polymer processing and use in a greater diversity of potential applications. The crosslinked hydrogels of the present invention can be processed to form particulates for delivery of active agents in pharmaceutical applications, and can be used as scaffolds in tissue engineering, tissue replacement, and tissue regeneration, as surgical sealants and tissue sealants for wound repair, as adhesives, and as coatings, involving both in vivo as well as ex vivo applications.

BRIEF DESCRIPTION OF THE FIGURES

The present invention is described with reference to the accompanying figures.

DETAILED DESCRIPTION OF THE PREFERRED EMBODIMENTS

Overview

To ensure clarity of the description that follows, the following definitions are provided:

The polymers of the present invention are preferably degradable. By "degradable" is meant that the material should be susceptible to degradation or destruction under certain conditions. For medical applications, the polymers are preferably biodegradable and biocompatible. By "biodegradable" is meant a material that should degrade by bodily processes or under conditions present in the body to products readily disposable by the body and should not accumulate in the body. The products of the biodegradation should also be biocompatible with the body. By "biocompatible" is meant not toxic to the body, is pharmaceutically acceptable, is not carcinogenic, and does not significantly induce inflammation in body tissues. As used herein, "body" preferably refers to the human body, but it should be understood that body can also refer to a non-human animal body.

Polymerization according to the methods of the present invention involves the combination of "monomers" or discrete chemical units. Monomers react with each other or with one or more other, different monomers to form a higher molecular weight compound called a "polymer." Polymerization of a single type of monomer generates a "homopolymer," that is, a polymer having only one type of building block unit in the polymer backbone. Polymerization of more than one type of monomer generates a "copolymer," that is, a polymer having more than one type of building block unit in the polymer backbone. Copolymerization requires the presence of at least two different monomers.

Copolymers of the Present Invention

The present invention relates to the synthesis of copolymers comprising a randomly distributed ring-opened ethylenically unsaturated epoxide, a ring-opened cyclic ester, and a hydrophilic segment. More particularly, the copolymers of the present invention comprise a copolymer of a cyclic ester (e.g., an α-hydroxy acid such as lactide and/or glycolide) randomly copolymerized with an ethylenically unsaturated epoxide (e.g., glycidyl methacrylate) by means of ring opening polymerization using ionic initiation with a macroinitiator (e.g., poly(ethylene glycol) or pluronics), thereby incorporating a hydrophilic segment into the copolymer, in the presence of a catalyst (e.g., stannous octoate). The resulting copolymer can be described generally as an ethylenically unsaturated poly(α-hydroxy acid-co-vinyl epoxide)-block-(hydrophilic segment)-block-poly(α-hydroxy acid-co-vinyl epoxide) copolymer. The block copolymer has the formula -{[O-$(CR_1R_2)_a$—C(O)]$_x$-[O-$(CHR_3)$—$(CHR_4)_y$-[HS]$_z$-[O-$(CR_1R_2)_a$—C(O)]$_x$—[O-$(CHR_3)$—$(CHR_4)[_y]$}-, wherein HS is a hydrophilic segment; $R_1$=H, alkyl or substituted alkyl; $R_2$=H, alkyl or substituted alkyl; $R_3$=H, alkyl, or substituted alkyl; and $R_4$=ethylenically unsaturated group; a =1 to 5; x is greater than or equal to one; y is greater than or equal to one; and z is greater than or equal to one. More particularly, when the cyclic ester is D,L. lactide (DLLA), the ethylenically unsaturated epoxide is glycidyl methacrylate (GMA), and the hydrophilic segment is poly(ethylene glycol) (PEG), the copolymer formed according to the present invention is poly(D,L-lactide-co-glycidyl methacrylate)-block-poly(ethylene glycol)-block-poly(D,L-lactide-co-glycidyl methacrylate). The synthesis of this copolymer is shown in Scheme 2, wherein the brackets labeled PLA indicate the lactide backbone of the copolymer and wherein the —O—C(O)—C(CH$_3$)=CH$_2$ group appended thereto is the ring-opened glycidyl methacrylate randomly distributed in the copolymer backbone.

mer can be any cyclic ester susceptible to cationic ring-opening polymerization. Examples of cyclic esters containing a single ester moiety, also called lactones, include propiolactone (four-membered ring), valerolactone (six-membered ring), caprolactone (seven-membered ring), and pentadecalactone (fifteen-membered ring). Examples of cyclic esters containing a single ester moiety, but also other nonaliphatic functionality in the ring include, for example, Scheme 2

The materials used for the synthesis of the copolymers of the present invention are as follows: D,L-lactide (99.9+%, Purac) was used as received. The amount of D,L-lactide used ranged from about 1 to about 50 wt. %. Glycolide (99.9+%, Purac) was used as received. The amount of glycolide used ranged from about 1 to about 50 wt. %. Poly(ethylene glycols) (Aldrich) were dried under vacuum at 110° C. before use. The amount of poly(ethylene glycol) used ranged from about 40 to about 95 wt. %. Pluronics (VWR) was used as received. The amount of pluronics used ranged from about 40 to about 95 wt. %. Glycidyl methacrylate (97%, Aldrich) was used as received. The amount of glycidyl methacrylate used ranged from about 1 to about 50 wt. %. Stannous octoate (Sigma) was used as the catalyst and was used as received. The amount of stannous octoate catalyst used ranged from about 0.001 to about 2 wt. %. Various chemical radical inhibitors were used to prevent premature and undesired polymerization. An example of a chemical radical inhibitor is 1,4-benzoquinone (Aldrich) and was used as received. The amount of chemical radical inhibitor used was about $10^{-3}$ to about $10^{-2}$ mol/L.

A typical procedure for the synthesis of the copolymers of the present invention is described as follows: Appropriate amounts of lactide and/or glycolide and poly(ethylene glycol) were weighed into a necked tube. The tube's contents were stirred and melted at 150° C. in an oil bath under nitrogen flow. After addition of the radical inhibitor solution in ether or dibutyl phthalate, the glycidyl methacrylate was added to the reaction tube. Then, the stannous octoate solution in ether or dibutyl phthalate was added to the tube, and the tube was evacuated using an oil pump and sealed under vacuum. The reaction proceeded at 175° C. for one hour, after which the tube was opened. The resulting copolymer was dissolved in THF, precipitated in ether, and recovered by filtration.

While the most preferred cyclic esters of the present invention are lactide and glycolide, the cyclic ester mono- 1,4-dioxan-2-one, wherein the other ring functionality is an ether linkage. Cyclic esters that contain two ester moieties in a single six-membered-ringed structure and have been used as monomers in ring-opening polymerization include lactide and glycolide. Preferably, the cyclic ester used in the present invention is either lactide, glycolide, caprolactone, 1,4-dioxan-2-one, a cyclic carbonate, or mixtures thereof. It should be appreciated that the present invention contemplates using a single ring-opened cyclic ester in the copolymer backbone as well as multiple different ring-opened cyclic esters in the copolymer backbone.

As described previously, lactic acid- and glycolic acid-based polymers are typically obtained by ring-opening polymerization of the corresponding diester dimers, lactide and glycolide, respectively, themselves. The resulting polymers of these ring-opening polymerization reactions are poly(lactic acid), also known as poly(lactide), abbreviated PLA and poly(glycolic acid), also known as poly(glycolide), abbreviated PGA. Copolymers incorporating both monomers are also available and are termed poly(lactide-co-glycolides) abbreviated PLGA and poly(glycolide-co-lactides) abbreviated PGLA, collectively PLGs. U.S. Pat. No. 5,650,173, previously incorporated herein by reference, describes examples of these commercially available polymers and copolymers based on lactic acid and glycolic acid.

In addition, the present invention contemplates using as the cyclic ester monomer caprolactams, in particular, N-vinylcaprolactam.

While glycidyl methacrylate is the preferred ethylenically unsaturated epoxide, the present invention contemplates the use of any epoxide containing a vinyl group, i.e., the ethylenical unsaturation, whether the vinyl group is further substituted or not. This includes epoxides with any additional functional groups as well. While not intended to limit the scope of the ethylenically unsaturated epoxides of the present invention, it is noted that U.S. Pat. No. 4,644,038 to Protzman, discussed previously and incorporated herein by reference, provides a sample of various unsaturated epoxides within the scope of the present invention. See U.S. Pat. No. 4,644,038, col. 6, line 65 through col. 8, line 39. It should also be appreciated that the present invention contemplates the synthesis of copolymers derived from multiple functionalized epoxides.

The hydrophilic segments of the copolymers of the present invention are derived from the macroinitiator used for ring opening polymerization and generally include one or more hydroxy, i.e., —OH, groups. It should be appreciated that the use of the term hydrophilic segment herein includes hydroxy-containing species, whether specifically termed hydrophilic (such as PEG) or not, and includes hydroxy-containing species also termed amphiphilic (such as pluronics). Suitable macroinitiators, which become the hydrophilic segments in the copolymers of the present invention, include those hydroxy-containing materials capable of imparting the requisite hydrophilicity to the copolymer, such that a hydrogel will be formed upon subsequent crosslinking of the copolymers. Examples of suitable macroinitiators include, but are not limited to, alkane diols (e.g., butanediol, hexanediol, tetraethylene glycol (TEG), and the like), alcohols with unsaturation (e.g., alkenols), long chain alcohols (e.g., hydroxy end-capped polymers, alcohols based on polyethylene glycol (PEG), also known as polyethylene oxide (PEG), polypropylene oxide (PPO), and the like), pluronics (hydroxy-terminated polyethylene oxide/polypropylene oxide block copolymers), fatty alcohols, cholesterol, and polyols (dendrimers, glycerol, polyvinylalcohol, and the like). Most preferably, the hydrophilic segment of the present invention is either PEG or pluronics. The present invention also contemplates the situation where the macroinitiator comprises alcohol-containing photopolymerizable groups. An example of such a photopolymerizable group is one that contains unsaturation as well as a hydroxy group, for example, hydroxyethylmethacrylate (HEMA). In addition, the present invention contemplates the incorporation of multiple hydrophilic segments in the copolymer, including the situation where the multiple hydrophilic segments are the same (i.e., derived from the same macroinitiator) as well as the situation where the multiple hydrophilic segments are different (i.e., derived from different macroinitiators). The incorporation of multiple hydrophilic segments may result when either an excess of the macroinitiator is added at the beginning of the polymerization reaction, beyond that required to initiate ring-opening polymerization, or when additional macroinitiators (either the same or different) are added during the polymerization reaction subsequent to the initial initiation.

In general, organometallic compounds are the preferred catalysts of the present invention. Examples of such organometallic compounds, include, but are not limited to, tin-, iron-, platinum-, titanium-, copper-, and zinc-containing compounds, and cationic photoinitiation salts, including sulfonium salts, phosphonium salts, and iodinium salts. Examples of particular organometallic compounds used as the catalyst of the present invention include titanium alkoxides, copper or iron phthalocyanines, zinc acetate, organoplatinum compounds, and organotin compounds, e.g., alkyltin ester compounds such as dibutyl tin diacetate, dibutyl tin dilaurate; dibutyl tin dioctoate and the like, halogen-containing organic tin compounds such as acetylacetonanto complex of tin dibromide, and tin orthoester compounds and the like. In a more preferred embodiment, the catalyst comprises a stannous, i.e., +2 oxidation state, organotin compound. Most preferably, the organotin compound is stannous (2-ethyl-hexanoate), also known as stannous octoate, and abbreviated $SnOct_2$.

Crosslinking of the Copolymers of the Present Invention

The present invention further relates to the crosslinking of the copolymers comprising a randomly distributed ring-opened ethylenically unsaturated epoxide, a ring-opened cyclic ester, and a hydrophilic segment by means of radical polymerization to form a chemically crosslinked hydrogel. In particular, the ethylenically unsaturated poly(α-hydroxy acid-co-vinyl epoxide)-block-(hydrophilic segment)-block-poly(α-hydroxy acid-co-vinyl epoxide) copolymers are crosslinked using a UV source in the presence of a UV initiator such as 2,2-dimethoxy-2-phenyl-acetophenone at room temperature or a heat sensitive initiator such as azoisobutyronitrile (AIBN) or benzoyl peroxide at moderate temperatures of about 60° C. to 80° C. The crosslinking can be carried out in an aqueous or organic solution as well as an emulsion or suspension of these unsaturated copolymers. The crosslinking of the copolymers of the present invention, in particular when the cyclic ester is D,L. lactide (DLLA), the ethylenically unsaturated epoxide is glycidyl methacrylate (GMA), and the hydrophilic segment is poly(ethylene glycol) (PEG), is shown in Scheme 3, wherein the brackets labeled PLA indicate the lactide backbone of the copolymer and wherein the —O—C(O)—C(CH$_3$)=CH$_2$ group appended thereto is the ring-opened glycidyl methacrylate randomly distributed in the copolymer backbone and through which unsaturation the crosslinking of the copolymers occurs.

Scheme 3

The materials used for the crosslinking of the copolymers are as follows: AIBN (Aldrich), a heat-sensitive initiator, was purified by recrystallization from methanol. The amount of heat-sensitive initiator used ranged from about $10^{-3}$ to about $10^{-2}$ mol/L. 2,2-dimethoxy-2-phenyl-acetophenone (Aldrich), a UV initiator, was used as received. The amount of UV initiator used ranged from about $10^{-3}$ to about $10^{-2}$ mol/L. Other crosslinking materials, activated by heat, UV irradiation, or otherwise, known to those of skill in the art are also comtemplated in the present invention.

A typical procedure for the crosslinking of the unsaturated copolymer is described as follows: A desired concentration of the unsaturated copolymer was prepared in phosphate buffer saline (PBS) solution or an organic solvent like tetrahydrofuran (THF) or chloroform. To this solution was added a chemical initiator, e.g., AIBN or benzoyl peroxide, and a crosslinking agent, e.g., ethylene glycol dimethacrylate (EGDMA). The final solution was heated at 60° C. to 80° C. The hydrogels were formed in about one to about two hours. Alternatively, to the unsaturated copolymer solution was added a UV sensitive initiator solution, e.g., 2,2-dimethoxy-2-phenyl-acetophenone in N-vinylpyrrolidone (NVP). Typically, the crosslinking solution comprises about 20 to about 25 wt. % of the unsaturated copolymer solution dissolved in water and about 10 wt. % of the UV sensitive initiator solution, based on the polymer content. The final solution was irradiated with long wavelength UV light at 365 nm. The hydrogels were formed generally in less than 15 minutes.

The following examples provide additional information on the synthesis of the copolymers and crosslinked hydrogels of the present invention.

EXAMPLE 1

Synthesis of Poly(D,L-lactide-co-glycidyl methacrylate)-block-Poly(Ethylene Glycol)-block-Poly(D,L-Lactide-co-Glycidyl Methacrylate) Block Copolymers via Ring-Opening Copolymerization of D,L-Lactide and Glycidyl Methacrylate Initiated from Poly(Ethylene Glycol) ($M_n$=4600).

D,L-Lactide (2 g), glycidyl methacrylate (2 mL) and poly(ethylene glycol) (PEG) (8.1 g, $M_n$=4600) were combined in a necked tube. After melting the reaction mixture at 150° C., 0.2 mL of 1 wt. % solution of 1,4-benzoquinone in dibutyl phthalate as a radical inhibitor and 0.5 mL of a 50 mg/mL solution of stannous octoate in dibutyl phthalate as a catalyst were added to the tube under nitrogen flow. The tube was degassed and sealed under vacuum. The reaction mixture was immersed in an oil bath and held at 175° C. for one hour. After opening the tube following the one hour reaction time, the reaction mixture was dissolved in THF and precipitated in ether. The copolymer that was obtained (Sample 1) was isolated by filtration, washed with ether and dried at room temperature under vacuum. The presence of methacrylate groups inside the polymer backbone was confirmed by $^1$H NMR. The number average molecular weight ($M_n$) of this copolymer as measured by gel permeation chromatograph (GPC) was 9,400 g/mol. The polydisperisty or polydispersity index, i.e., $M_w/M_n$ where $M_w$ is the weight average molecular weight of this copolymer, was 1.09. The inherent viscosity (IV) for this copolymer was 0.18 dL/g.

EXAMPLE 2

Synthesis of Poly(D,L-Lactide-co-Glycidyl Methacrylate)-block-Poly(Ethylene Glycol)-block-Poly(D,L-Lactide-co-Glycidyl Methacrylate) Block Copolymers Containing Different Weight Ratios of D,L-Lactide and PEG ($M_n$=4600).

Poly(D,L-lactide-co-glycidyl methacrylate)-block-poly(ethylene glycol)-block-poly(D,L-lactide-co-glycidyl methacrylate) block copolymers with various D,L-lactide to poly(ethylene glycol) ratios were prepared according to the synthesis procedure described in Example 1, where PEG=poly(ethylene glycol) ($M_n$=4600); DLLA=D,L-lactide; and GMA=glycyidyl methacrylate. The results are summarized in Table 1.

TABLE 1

| Sample No. | PEG:DLLA:GMA (wt. %:wt. %:wt. %) Feed | PEG:DLLA:GMA (mol:mol:mol) Feed | PEG:DLLA:GMA (mol:mol:mol) $^1$H NMR | $M_w$ (g/mol) | $M_w/M_n$ | IV (dL/g) |
|---|---|---|---|---|---|---|
| 1 | 66.5:16.4:17.1 | 1.0:8.2:9.1 | 1.0:1.3:1.8 | 10,300 | 1.09 | 0.18 |
| 2A | 66.7:24.7:8.6 | 1.0:12.7:4.5 | 1.0:8.1:1.3 | 10,700 | 1.09 | 0.17 |
| 2B* | 44.3:44.3:11.4 | 1.0:34.5:9.1 | 1.0:22.4:2.1 | 11,700 | 1.08 | 0.20 |
| 2C | 66.5:33.5:0.0 | 1.0:16.1:0.0 | 1.0:14.0:0.0 | 10,100 | 1.11 | 0.17 |

*Reaction time of 2 hours.

Figure 1:
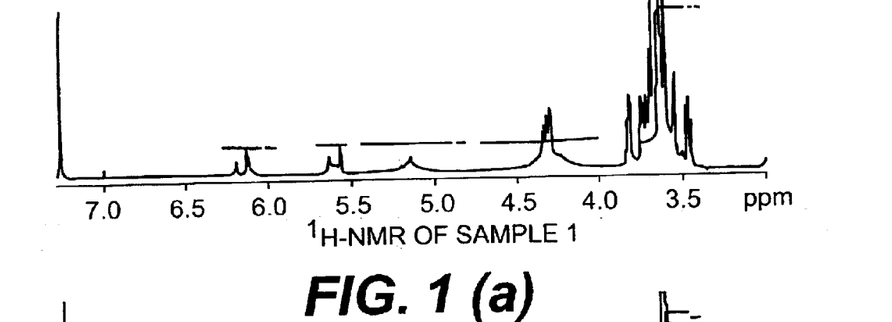
FIGS. 1(a)–1(d) are the $^1$H NMR spectra of poly(D,L-lactide-co-glycidyl methacrylate)-block-poly(ethylene glycol)-block-poly(D,L-lactide-co-glycidyl methacrylate) copolymers according to the present invention. In particular the $^1$H NMR spectrum of the copolymer of Sample 1 is shown in FIG. 1(a), wherein the ratio of PEG:DLLA:GMA is 66.5/16.4/17.1 wt. %; the $^1$H NMR spectrum of the copolymer of Sample 2A is shown in FIG. 1(b), wherein the ratio of PEG:DLLA:GMA is 66.7:24.7:8.6 wt. %; the $^1$H NMR spectrum of the copolymer of Sample 2B is shown in FIG. 1(c), wherein the ratio of PEG:DLLA:GMA is 44.3:44.3:11.4 wt. %; and the $^1$H NMR spectrum of the copolymer according to Example 6, i.e., Sample 6, is shown in FIG. 1(d), wherein the average molecular weight ($M_n$) of PEG is 6000.

For the experiments shown in Table 1, the catalyst used was $SnOct_2$ at 1.0 wt. % based on the weight of DLLA and GMA. The presence of methacrylate groups inside the polymer backbone was confirmed by $^1H$ NMR and is shown in FIGS. 1(a), 1(b), and 1(c), for Samples 1, 2A, and 2B, respectively, by the peaks at approximately 5.6 ppm and 6.2 ppm.

EXAMPLE 3

Synthesis of Poly(D,L-Lactide-co-Glycidyl Methacrylate)-block-Poly(Ethylene Glycol)-block-Poly(D,L-Lactide-co-Glycidyl Methacrylate) Block Copolymers Containing PEG with Different Molecular Weights.

Poly(D,L-lactide-co-glycidyl methacrylate)-block-poly(ethylene glycol)-block-poly(D,L-lactide-co-glycidyl methacrylate) block copolymers with various PEGs of different molecular weights were prepared according to the synthesis procedure described in Example 1, where PEG=poly(ethylene glycol) of the molecular weight indicated; DLLA=D,L-lactide; and GMA=glycyidyl methacrylate. All reaction times were 2 hours at 175° C. The results are summarized in Table 2.

TABLE 2

| Sample No. | PEG ($M_n$) | PEG:DLLA:GMA (wt. %:wt. %:wt. %) Feed | PEG:DLLA:GMA (mol:mol:mol) Feed | PEG:DLLA:GMA (mol:mol:mol) $^1H$ NMR | Solubility in Water at 20 wt. % |
|---|---|---|---|---|---|
| 3A | 10,000 | 44.3:44.3:11.4 | 1.0:69.4:18.1 | 1.0:26.7:2.3 | Soluble |
| 2B | 4,600 | 44.3:44.3:11.4 | 1.0:34.5:9.1 | 1.0:22.4:2.1 | Soluble |
| 3C | 3,350 | 44.3:44.3:11.4 | 1.0:23.3:6.1 | 1.0:13.5:1.0 | Soluble |
| 3D | 1,500 | 44.3:44.3:11.4 | 1.0:10.4:2.7 | N/A | Not Soluble |
| 3E | 400 | 44.3:44.3:11.4 | 1.0:2.8:0.7 | N/A | Not Soluble |

For the experiments shown in Table 2, the catalyst used was $SnOct_2$ at 1.0 wt. % based on the weight of DLLA and GMA. The presence of methacrylate groups inside the polymer backbone of the copolymers was confirmed by $^1H$ NMR (data not shown), similar to Samples 1, 2A, and 2B shown in FIG. 1. Solubility data for the various copolymers as described in Table 2 were based on a visual analysis using a 20 wt. % solution of the copolymer in water.

EXAMPLE 4

Photocrosslinking of Aqueous Solutions of Poly(D,L-Lactide-co-Glycidyl Methacrylate)-block-Poly(Ethylene Glycol)-block-Poly(D,L-Lactide-co-Glycidyl Methacrylate) Block Copolymers Using Long Wavelength UV Irradiation.

A 20 wt. % solution of the copolymer of Example 1 (Sample 1) was prepared by solubilizing 250 mg of the copolymer in 1 mL of PBS with pH of 7.4. Into a 4 mL vial was added 250 mg of this solution, followed by addition of 25 mg of a 300 mg/mL solution of 2,2-dimethoxy-2-phenyl-acetophenone in N-vinyl pyrrolidone (NVP) as a UV initiator. Using a portable UV lamp, the solution was irradiated with long wavelength UV radiation at 365 nm. The hydrogel was formed in about ten minutes.

The copolymers of poly(D,L-lactide-co-glycidyl methacrylate)-block-poly(ethylene glycol)-block-poly(D,L-lactide-co-glycidyl methacrylate) prepared in Examples 2 and 3, and described in Tables 1 and 2, were also submitted to the photocrosslinking conditions in PBS solution just described. The same gelation effect was observed for the PBS solutions of Samples 2A, 2B, 3A, and 3C.

EXAMPLE 5

Gel Content and Water Content of Photocrosslinked Hydrogels of Poly(D,L-Lactide-co-Glycidyl Methacrylate)-block-Poly(Ethylene Glycol)-block-(D,L-Lactide-co-Glycidyl Methacrylate) Block Copolymers.

The gel content of the photocrosslinked copolymers was calculated using the following formula:

$$\text{Gel Content (\%)} = W_2/W_1 \times 100$$

wherein $W_1$=dried weight of the copolymer after reaction, and $W_2$=dried weight of the copolymer after extraction with $CHCl_3$.

For Sample 2A, four data points were obtained to determine gel content: 57.8, 57.6, 57.1, 58.2%, for an average of 57.7%. For Sample 2B, four data points were obtained to determine gel content: 47.1, 46.3, 46.1, and 45.6%, for an average of 46.3%.

The water content of the swelled photocrosslinked copolymer gels was calculated using the following formula:

$$\text{Water Content (\%)} = (W_3 - W_2)/W_3 \times 100$$

wherein $W_2$=dried weight of the copolymer after extraction with $CHCl_3$, as above, and $W_3$=swollen weight of the gel after swelling the dried gel in Hepes buffer solution at pH=7.4 for 6 hours.

For Sample 2A, four data points were obtained to determine water content of the gel: 90.6, 90.7, 90.2, 90.4%, for an average of 90.5%. For Sample 2B, four data points were obtained to determine water content of the gel: 87.8, 85.1, 85.7, and 85.5%, for an average of 86.0%.

As a further means of comparison, no gelation was observed for a copolymer (Sample 2C) that did not contain glycidyl methacrylate and only contained PEG and D,L-lactide. In this comparative experiment, polyethylene glycol (8.1 g, $M_n$=4600), D,L-lactide (3.5 g), stannous octoate (0.5 mL of a 50% solution in dibutylphthalate), and 1,4-benzoquinone (0.03 mL of a 1% solution in dibutylphthalate) were mixed in a reaction vessel. The vessel was sealed under vacuum and immersed in an oil bath at 175° C. for one hour. After the reaction period was over, the contents were extracted with THF and precipitated from ether, resulting in 9.9 g of the copolymer obtained. This copolymer was then subjected to the photocrosslinking conditions in PBS solution described above. Even using very long periods of UV irradiation, no gel was observed to form. This indicated that the incorporation of the glycidyl methacrylate by means of ring-opening polymerization into the polyester backbone was responsible for the subsequent photocrosslinking of PBS solutions of the copolymers of Samples 1, 2A, 2B, 3A, and 3C and for the formation of the hydrogels therefrom.

EXAMPLE 6

One Step Synthesis of Poly(D,L-Lactide-co-Glycidyl Methacrylate)-block-Poly(Ethylene Glycol)-block-Poly(D,L-Lactide-co-Glycidyl Methacrylate) Block Copolymers without a Precipitation Purification Step; Subsequent Photocrosslinking of their Aqueous Solutions Using Long Wavelength UV Irradiation.

D,L-lactide (2.43 g, 16.9 mmol) and PEG ($M_n$=6000, 10.2 g, 1.7 mmol) were combined in a 50 mL glass tube and heated in an oil bath at 155° C. After the reagents melted, 0.03 mL of a 1 wt. % solution of 1,4-benzoquinone in dibutylphthalate, glycidyl methacrylate (1.20 g, 8.5 mmol), and 0.75 mL of a 50 wt. % solution of stannous octoate in dibutylphthalate were added, and the tube sealed under vacuum. The reaction proceeded at 175° C. for one hour, after which the reaction was quenched by immersing the tube in liquid nitrogen. The amount of copolymer obtained was 13.24 g (Sample 6). GC analysis of this copolymer indicated only residual amounts of glycidyl methacrylate (0.004 wt. %) and D,L-lactide (0.76 wt. %) remained. The presence of methacrylate groups in the copolymer backbone was confirmed by $^1$H NMR spectroscopy and is shown in FIG. 1(d). The ability to use the copolymers of the present invention synthesized by means of a one step synthetic procedure as just described in subsequent crosslinking reactions to form hydrogels results from the low amount of residual glycidyl methacrylate in the pre-crosslinked copolymer.

A PBS solution of the resulting copolymer (25 wt. %) containing 10 wt. % of a UV initiator (300 mg of 2,2-dimethoxy-2-phenyl-acetophenone in NVP) was then exposed to long wavelength UV irradiation, and a gel was formed completely in about thirty minutes.

A copolymer was prepared according to the synthetic procedure of Example 6 using only PEG and D,L-lactide in the amounts as described in Example 6, but not glycidyl methacrylate. Rather, a suspension of glycidyl methacrylate was physically mixed with the PEG-block-poly(D,L-lactide) copolymer just described. Then, a PBS solution of the copolymer (23 wt. %) and the suspension of glycidyl methacrylate containing 10 wt. % of a UV initiator (300 mg of 2,2-dimethoxy-2-phenyl-acetophenone in NVP) was exposed to long wavelength UV irradiation. No gelation was observed. This result indicated that it is essential that glycidyl methacrylate be chemically present in the backbone of the polymer, i.e., glycidyl methacrylate actually in the backbone of the PEG:DLLA:GMA copolymers, for a gel to form when exposed to photocrosslinking conditions. Mere physical suspension of glycidyl methacrylate in a copolymer solution does not form a gel under the photocrosslinking conditions used herein.

EXAMPLE 7

In Vitro Degradation Studies of (D,L-Lactide-co-Glycidyl Methacrylate)-block-Poly(Ethylene Glycol)-block-(D,L-Lactide-co-Glycidyl Methacrylate) Block Copolymers Photocrosslinked Hydrogels.

The crosslinked copolymers as described in the formulations of Example 4 were studied to determine their degradation properties in a Hepes buffer solution at pH=7.4 over time.

For Sample 1 (DLLA 16.4 wt. %), the gel before placement in the Hepes buffer solution was soft and did not readily keep its shape. When placed in the Hepes buffer solution, the gel disintegrated quickly and disappeared after 10 to 15 days. As a result, it was not possible to measure weight loss over time. For Sample 2A (DLLA 24.7 wt. %) and Sample 2B (DLLA 44.3 wt. %), both of the gels before placement in the Hepes buffer solution were solid and readily kept their shape. When placed in the Hepes buffer solution, both of the gels softened upon swelling, but did not disintegrate completely, even after one month in the Hepes buffer solution. The weight loss of the gel after that one month period was about 60%. In contrast, the gels chemically degrade in 1 N NaOH, and are completely soluble.

Comparison of the degradation study results for Sample 1 with Samples 2A and 2B indicates that increasing the amount of D,L-lactide in the copolymer backbone improves the degradation properties of the gel.

EXAMPLE 8

Reaction Kinetics of the Synthesis of Poly(D,L-Lactide-co-Glycidyl Methacrylate)-block-Poly(Ethylene Glycol)-block-Poly(D,L-Lactide-co-Glycidyl Methacrylate) Block Copolymers via Ring-Opening Copolymerization of D,L-Lactide and Glycidyl Methacrylate Initiated from Poly(Ethylene Glycol) ($M_n$=4600) in the Presence of Stannous Octoate.

The kinetics of the copolymerization reaction of PEG, DLLA, and GMA was studied by allowing the reaction to proceed for a certain length of time, quenching the reaction, and analyzing the reaction mixture by gas chromatography (GC) to determine the amount of residual monomers present in the reaction mixture. In particular, four separate glass reaction tubes were filled with PEG (9.2 g, 62.0 wt. %, $M_n$=4600) and D,L-lactide (4.32 g, 29.0 wt. %), and heated at 155° C. under a nitrogen stream until the reactants melted. Then, glycidyl methacrylate (1.42 g, 10.0 wt. %), 0.2 mL of a 1 wt. % solution of the radical inhibitor 1,4-benzoquinone, and 0.5 mL of a 50 wt. % solution of stannous octoate were added. The tubes were sealed under vacuum and heated at 175° C. At predetermined times (1.0, 2.0, 4.5, and 8.0 hours), the tubes were removed from the heat source, quenched in liquid nitrogen, and a sample of the reaction mixture analyzed by GC to determine the amount of residual monomers in the reaction mixture. Table 3 summarizes the results.

TABLE 3

| Reaction Time (hours) | Residual DLLA (wt. %) | Residual GMA (wt. %) |
|---|---|---|
| 0.0 | 29.0 | 10.0 |
| 1.0 | 0.73 | 0.4 |
| 2.0 | 0.90 | <0.003 |
| 4.5 | 1.11 | <0.003 |
| 8.5 | 0.80 | <0.003 |

Figure 2:
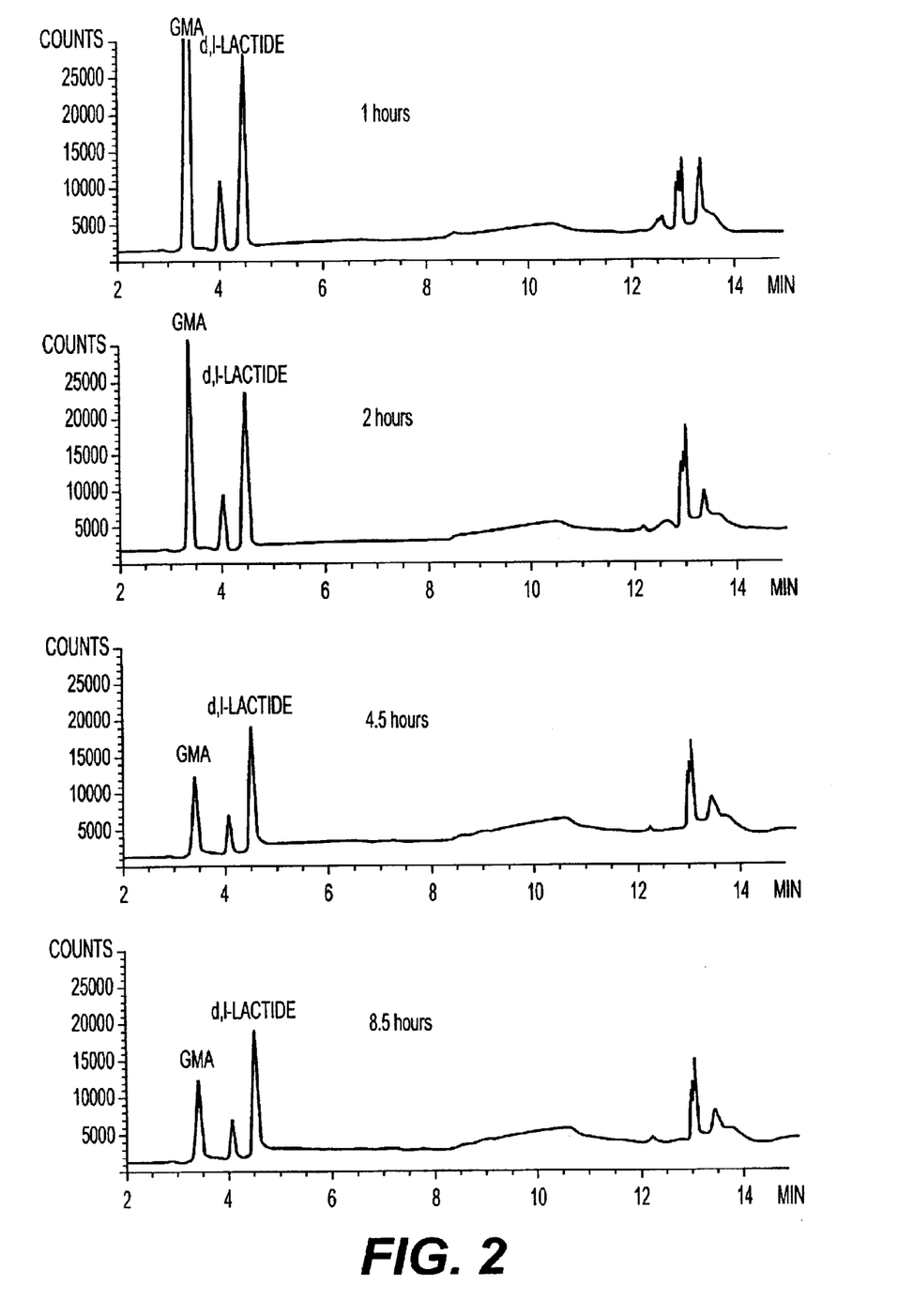
FIG. 2 shows the relevant gas chromatograms of samples of the reaction mixture during the synthesis of poly(D,L-lactide-co-glycidyl methacrylate)-block-poly(ethylene glycol)-block-poly(D,L-lactide-co-glycidyl methacrylate) copolymers according to Example 8 after 1.0, 2.0, 4.5, and 8.5 hours of reaction.

FIG. 2 shows the relevant gas chromatograms of the samples of the reaction mixture analyzed after 1.0, 2.0, 4.5, and 8.5 hours of reaction. As can be seen from the data in Table 3 and the gas chromatograms, the small amount of residual GMA after approximately 2 hours of reaction time indicates that essentially complete reaction has occurred.

EXAMPLE 9

Effect of Catalyst Concentration on the Synthesis of Poly(D,L-Lactide-co-Glycidyl Methacrylate)-block-Poly(Ethylene Glycol)-block-Poly(D,L-Lactide-co-Glycidyl Methacrylate) Block Copolymers.

Four reaction tubes were charged with PEG (67.7 wt. %, $M_n$=6000), DLLA (24.3 wt. %), and GMA (8.0 wt. %). To each tube was added a different concentration of stannous octoate catalyst as shown in Table 4, expressed as a weight percent based on the weight of GMA and DLLA. Each reaction proceeded at 175° C. for one hour before quenching and subsequent GC analysis of the residual amounts of reactants. The results are summarized in Table 4.

TABLE 4

| Tube No. | SnOct$_2$ used (wt. %)* | Residual DLLA (wt. %) | Residual GMA (wt. %) |
|---|---|---|---|
| I | 0.18 | 1.20 | 2.10 |
| II | 0.60 | 1.13 | 0.78 |
| III | 1.30 | 1.16 | 0.29 |
| IV | 1.90 | 0.92 | 0.20 |

*Based on the weight of GMA and DLLA.

The data in Table 4 indicate that a catalyst concentration below 0.60 wt. % results in an excess of residual GMA, while a catalyst concentration above 1.30 wt. % does not provide significant additional benefit. Thus, a stannous octoate catalyst concentration of about 0.6 to about 1.9 wt. % is preferred, of about 0.6 to about 1.3 wt. % is more preferred, and about 1.0 wt. % is most preferred.

It should be appreciated that the present invention also involves the synthesis of copolymers derived from multiple functionalized epoxides, one or more cyclic esters, and one or more hydrophilic segments (either the same or different). Analogous ring-opening polymerization catalyst systems as well as analogous crosslinking initiating systems as described above can be used for these copolymerization and crosslinking reactions, respectively.

Applications a. Active Agent Delivery Systems:

The present invention describes a copolymer that, when crosslinked to form a hydrogel, improves the release profile and bioavailability of an encapsulated active agent, such as a protein. An improved bioavailability indicates that more of the dose of the active agent is having a therapeutic effect, which could allow less drug to be used (at lower cost). The following example shows the use of the crosslinked hydrogel copolymers of the present invention to improve the bioavailability of active agents.

EXAMPLE 10

In Vivo Release Studies of α-IFN from Crosslinked Poly(D,L-Lactide-co-Glycidyl Methacrylate)-block-Poly(Ethylene Glycol)-block-Poly(D,L-Lactide-co-Glycidyl Methacrylate) Hydrogel Copolymers.

In vivo release studies of α-IFN using the polymers of the present invention were performed. In particular, the crosslinked copolymer hydrogels of Samples 1 and 6 were used. Solutions of these copolymers (20 wt. % copolymer in PBS (250 mM)) (230 μL) containing 10 wt. % photoinitiator, i.e., 2,2-dimethoxy-2-phenyl-acetophenone, were vortexed with 20 μL of α-IFN solution in PBS (concentration=3.7 mg/mL) in a 1.5 mL effendorf tube. These vortexed solutions were transferred to round glass molds and irradiated with UV light (wavelength=365 nm) for about 30 to 40 minutes, at which point a firm gel held in the mold when the mold was inverted. The gels were removed from the molds and implanted into male Sprague-Dawley rats weighing 400+/−50 grams. The rats were anesthetized, after which a small incision was made in the intrascapular region, the gels were implanted into the subcutaneous space, and the incision stapled shut. The rats were immunosuppressed by treating with 5 mg/kg Sandimmune Cyclosporine IP daily for 0 to 14 days (except Sundays) and three times per week after day 15.

Figure 3:
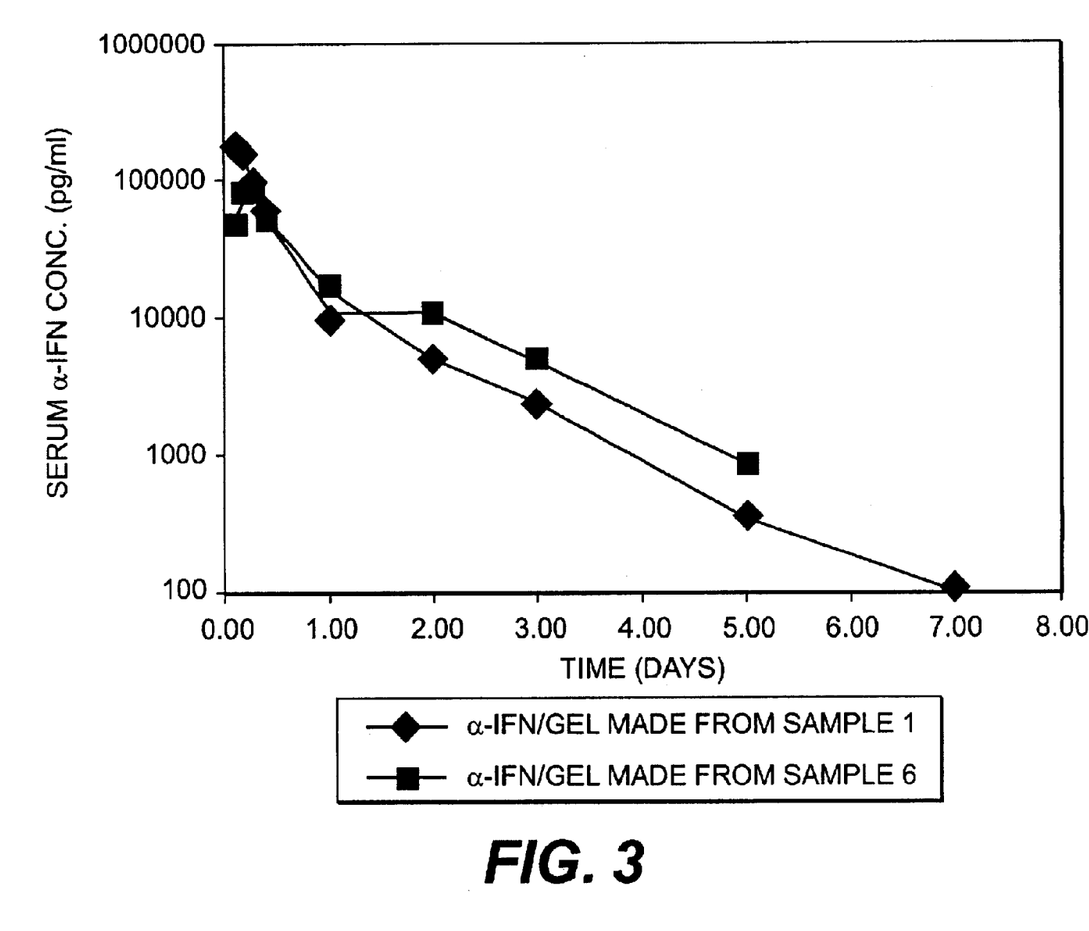
FIG. 3 shows the results of the in vivo α-IFN release study for both the crosslinked copolymers of Sample 1 and Sample 6, wherein the serum concentration of α-IFN is plotted as a function of time (data normalized to 1 mg/kg).

Blood samples were collected by means of a lateral tail vein at the two-, four-, six-, and eight-hour marks as well as the one-, two-, three-, five-, seven-, nine-, thirteen-, sixteen-, and twenty-day marks. The blood was collected via syringe without an anticoagulant and transferred to a blood serum separator tubes. The blood was allowed to clot for 30 minutes at room temperature and centrifuged at 6000 g for 5 minutes at room temperature. The separated serum was stored at a temperature below −70° C. The serum was analyzed by ELISA to determine α-IFN concentration. FIG. 3 shows the results of the in vivo α-IFN release study for both the crosslinked copolymers of Sample 1 and Sample 6. The data shown in FIG. 3 are normalized to 1 mg/kg, wherein the actual dose was approximately 0.17 mg/kg. These results show a 60 to 80% increase in bioavailability relative to intravenous bolus and a 180 to 230% increase in bioavailability relative to a subcutaneous bolus. This increase in bioavailability makes clear the benefits of using the crosslinked copolymers of the present invention for drug release applications.

In another embodiment of the present invention, the copolymers synthesized according to the methods of the present invention are used in the preparation of particulates and capsules. In a more preferred embodiment, the present invention relates to improved methods of preparing a pharmaceutical composition in particulate or capsule form. The pharmaceutical composition may be designed for the controlled release of an effective amount of an active agent over an extended period of time. Moreover, the pharmaceutical compositions as described herein may additionally comprise a second polymer, e.g., as an additive or a blend, depending on the desired properties of the pharmaceutical compositions.

The methods of the present invention may be carried out using pre-formed particulates, or may additionally comprise the production of the particulates. It should be readily apparent to one skilled in the art, that the present invention is not limited to any particular method of preparing a finished particulate or capsule product. Particulate formation may be effected by methods known to one skilled in the art and include any means of mechanical disruption. Those methods include, but are not limited to, spray drying, sonication, ultrasound, mutual dielectrophoresis, coacervation, and phase separation processes such as those described in U.S. Pat. No. 5,718,921, issued to Mathiowitz et al., entitled "Microspheres Comprising Polymer and Drug Dispersed There Within," and U.S. Pat. No. 6,235,224, issued to Mathiowitz et al., entitled "Process of Preparing Microparticles Through Phase Inversion Phenomena," both patents being incorporated herein by reference. Suitable methods of preparing a particulate or capsule product are disclosed in, for example, the following U.S. patents, each of which is incorporated herein by reference: U.S. Pat. Nos. 3,737,337; 4,389,330; 5,407,609; 5,650,173; 5,654,008; 5,792,477; 5,019,400; 5,916,598; 5,945,126; and 6,110,503.

Particulates and capsules can be prepared using emulsion-based methods, including all emulsion-based processes, including W/O/W, S/O/W, S/O/O, and W/O/O, wherein W=water, O=oil, and S=solid. Suitable emulsion-based methods include phase separation methods that use a coacervating agent. Other suitable emulsion-based methods include non-phase separation methods that use other means for extracting solvent to form hardened particulates. In one preferred embodiment of the present invention using an emulsion-based method to produce particulates or capsules, the method includes preparing an emulsion that comprises a first phase and a second phase. The first phase preferably comprises an active agent, a polymer, and a solvent for the polymer. The second phase is a continuous phase, preferably an aqueous phase. The solvent is extracted from the emulsion to form particulates containing the active agent.

Alternatively, in another preferred embodiment, suitable methods of preparing a finished particulate product are accomplished by using Prolease® technology, developed by Alkermes Controlled Therapeutics, Inc. I of Cambridge, Mass., and as described in U.S. Pat. No. 5,019,400, issued to Gombotz et al., entitled "Very Low Temperature Casting of Controlled Release Microspheres," and U.S. Pat. No. 5,922,253, issued to Herbert et al., entitled "Production Scale Method of Forming Microprarticles," both incorporated herein by reference. The Prolease® technology generally involves the preparation of particulates using very cold temperatures to freeze mixtures of a polymer and an active agent forming polymeric particulates. More particularly, a polymer is dissolved in a solvent together with an active agent forming a mixture. This mixture is atomized into a vessel containing a liquid non-solvent, alone or frozen and overlayed with a liquefied gas, at a temperature below the freezing point of the polymer/active agent solution. When the combination with the liquefied gas is used, the atomized droplets freeze into particulates upon contacting the cold liquefied gas, then sink onto the frozen non-solvent layer. If frozen, the non-solvent is then thawed. As the non-solvent thaws, the particulates which are still frozen sink into the liquid non-solvent. The solvent in the particulates then thaws and is extracted into the non-solvent, resulting in a hardened particulate containing active agent either as a homogeneous mixture of the polymer and the active agent or as a heterogeneous two phase system of discrete zones of polymer and active agent. If a cold non-solvent is used alone, the atomized droplets freeze upon contacting the solvent, and sink to the bottom of the vessel. As the non-solvent for the polymer is warmed, the solvent in the particulates thaws and is extracted into the non-solvent, resulting in hardened particulates. Excipients that modify, release or stabilize the encapsulated active agent can also be incorporated (e.g., U.S. Pat. No. 6,156,508 issued to Tracy et al., entitled "Controlled Release of Metal Cation-Stabilized Interferon," incorporated herein by reference).

In addition, in yet another preferred embodiment, suitable methods of preparing a finished particulate product can be accomplished by using the AIR™ inhalation delivery technology, developed by Advanced Inhalation Research, Inc. of Cambridge, Mass., and as described in U.S. Pat. Nos. 5,874,064 and 6,136,295, both issued to Edwards et al., and both entitled "Aerodynamically Light Particles for Pulmonary Drug Delivery," and both incorporated herein by reference. The AIR™ inhalation delivery technology is a pulmonary delivery system whereby active agents are delivered to the respiratory tract. The formation of aerodynamically light particles for use in the AIR™ inhalation delivery technology can be accomplished by various methods known to those of ordinary skill in the art, including single and double emulsion solvent evaporation, spray drying, and solvent extraction.

The polymers of the present invention may also be used to prepare pharmaceutical compositions in particulate or capsule form for oral administration. The pharmaceutical composition may be designed for the controlled release of an effective amount of an active agent over an extended period of time.

The formulation prepared by the process of the present invention may contain an active agent dispersed in the particulate polymeric matrix material. The amount of such agent incorporated in the particulates can range from very small to very large amounts, i.e., from about 0.1 wt. % to about 90 wt. %, preferably 0.5 wt. % to 30 wt. %.

Examples of active agents that can be encapsulated by the particulate or capsule formulation methods of the present invention are legion and include generally, for example, such molecules as peptides, proteins, biopolymers, small molecules, and macromolecules. Preferred active agents are proteins.

More specific examples of active agents include the following: local anesthetics; non-steroidal antifertility agents; parasympathomimetic agents; psychotherapeutic agents; tranquilizers; decongestants; sedative hypnotics; steroids; sulfonamides; sympathomimetic agents; vaccines; vitamins; antimalarials; anti-migraine agents; anti-Parkinson agents such as L-dopa; anti-spasmodics; anticholinergic agents (e.g. oxybutynin); antitussives; bronchodilators; cardiovascular agents such as Coronary vasodilators and nitroglycerin; alkaloids; analgesics; narcotics such as codeine, dihydrocodienone, meperidine, morphine and the like; non-narcotics such as salicylates, aspirin, acetaminophen, d-propoxyphene and the like; opioid receptor antagonists, such as naltrexone and naloxone; antibiotics such as gentamycin, tetracycline and penicillins; anti-cancer agents; anti-convulsants; anti-emetics; antihistamines; anti-inflammatory agents such as hormonal agents, hydrocortisone, prednisolone, prednisone, non-hormonal agents, allopurinol, indomethacin, phenylbutazone and the like; prostaglandins and cytotoxic drugs; estrogens; antibacterials; antifungals; antivirals; anticoagulants; anticonvulsants; antidepressants; antihistamines; immunological agents;

Other examples of suitable biologically active agents include viruses and cells, peptides (e.g., luteinizing-hormone-releasing-hormone analogues, such as goserelin and exendin) and proteins, analogs, muteins, and active fragments thereof, such as immunoglobulins, antibodies, cytokines (e.g. lymphokines, monokines, chemokines), blood clotting factors, hemopoietic factors, interleukins (IL-2, IL-3, IL-4, IL-6), interferons ($\beta$-IFN, ($\alpha$-IFN and $\gamma$-IFN), erythropoietin, nucleases, tumor necrosis factor, colony stimulating factors (e.g., GCSF, GM-CSF, MCSF), insulin, enzymes (e.g., superoxide dismutase, tissue plasminogen activator), tumor suppressors, blood proteins, gonadotropins (e.g., FSH, LH, CG, etc.), hormones and hormone analogs (e.g., growth hormone, adrenocorticotropic hormone and luteinizing hormone releasing hormone (LHRH)), vaccines (e.g., tumoral, bacterial and viral antigens); somatostatin; antigens; blood coagulation factors; growth factors (e.g., nerve growth factor, insulin-like growth factor); protein inhibitors, protein antagonists, and protein agonists; nucleic acids, such as antisense molecules, DNA and RNA; oligonucleotides; and ribozymes. Small molecular weight agents suitable for use in the invention include, antitumor agents such as bleomycin hydrochloride, carboplatin, methotrexate and adriamycin; antipyretic and analgesic agents; antitussives and expectorants such as ephedrine hydrochloride, methylephedrine hydrochloride, noscapine hydrochloride and codeine phosphate; sedatives such as chlorpromazine hydrochloride, prochlorperazine hydrochloride and atropine sulfate; muscle relaxants such as tubocurarine chloride; antiepileptics such as sodium phenytoin and ethosuximide; antiulcer agents such as metoclopramide; antidepressants such as clomipramine; antiallergic agents such as diphenhydramine; cardiotonics such as theophillol; antiarrhythmic agents such as propranolol hydrochloride; vasodilators such as diltiazem hydrochloride and bamethan sulfate; hypotensive diuretics such as pentolinium and ecarazine hydrochloride; antidiuretic agents such as metformin; anticoagulants such as sodium citrate and heparin; hemostatic agents such as thrombin, menadione sodium bisulfite and acetomenaphthone; antituberculous agents such as isoniazide and ethanbutol; hormones such as prednisolone sodium phosphate and methimazole.

Other preferred active agents include 1,2-benzazoles, more particularly, 3-piperidinyl-substituted 1,2-benzisoxazoles and 1,2-benzisothiazoles, including 3-[2-[4-(6-fluoro-1,2-benzisoxazol-3-yl)-1-piperidinyl]ethyl]-6,7,8,9-tetrahydro-2-methyl-4H-pyrido-[1,2-a]pyrimidin-4-one ("risperidone") and 3-[2-[4-(6-fluro-1,2-benzisoxazol-3-yl)-1-piperidinyl]ethyl]-6,7,8,9-tetrahydro-9-hydroxy-2-methyl-4H-pyrido[1,2-a]pyrimidin-4-one ("9-hydroxyrisperidone") and the pharmaceutically acceptable salts thereof. Risperidone (which term, as used herein, is intended to include its pharmaceutically acceptable salts) is also preferred. Risperidone can be prepared in accordance with the teachings of U.S. Pat. No. 4,804,663, which is incorporated herein by reference. 9-hydroxyrisperidone can be prepared in accordance with the teachings of U.S. Pat. No. 5,158,952, which is incorporated herein by reference.

In addition to delivery systems for active agents based on the formation of particulates, such delivery systems can also be formulated using microchips. An example of such systems is described in U.S. Pat. No. 5,797,898, which is incorporated herein by reference. In general, such active agent delivery systems involve etching of reservoirs into a substrate, such as silicon, using any etching technique commonly used in the field of microfabrication, such as chemical (wet) etching or ion (dry) etching techniques. The active agents to be released in a controlled manner are placed in the reservoirs. The reservoirs are capped with a material that degrades at a known rate or has a known permeability for the active agents. The degradable polymers of the present invention can be used to make the substrates into which the reservoirs are etched and/or the caps for the reservoirs. Similar approaches can be used to develop ingestible, injectible or implantable delivery systems that comprise multiple reservoirs containing one or more biologically active agents. The preferred polymer of the present invention is one that can be chemically or photochemically cured.

The polymers of the present invention when used as active agent delivery systems could also be used in applications where it is desirable for the polymer to undergo a phase transition when coming in contact with physiological conditions. Thermoresponsive polymers were described previously, as in U.S. Pat. No. 5,702,717, issued to Cha, et al., entitled "Thermosensitive Biodegradable Polymers Based on Poly(Ether-Ester) Block Copolymers," and U.S. Pat. No. 6,004,573, issued to Rathi et al., entitled "Biodegradable Low Molecular Weight Triblock Poly(Lactide-Co-Glycolide) Polyethylene Glycol Copolymers Having Reverse Thermal Gelation Properties," both of which were previously incorporated herein by reference. The polymers of the present invention could similarly be used when it is desirable to have polymers that are liquid when injected into the body but gel or solidify at body temperatures. Additionally, the polymers of the present invention could be used similarly to the polymers described earlier in U.S. Pat. No. 5,968,542, issued to Tipton, entitled "High Viscosity Liquid Controlled Delivery System as a Device"; U.S. Pat. No. 6,143,314, issued to Chandrashekar et al., entitled "Controlled Release Liquid Delivery Compositions with Low Initial Drug Burst"; and U.S. Pat. No. 5,340,849, issued to Dunn et al., entitled "Biodegradable In-Situ Forming Implants and Methods for Producing the Same," all three patents previously incorporated herein by reference. In this application, polymers dissolved in solvents are injected into the body, after which the polymers solidify as the solvent is replaced by water.

b. Medical Uses other than Active Agent Delivery Systems:

The degradable crosslinked hydrogel copolymers of the present invention can also be used in other medical applications not involving active agent delivery systems. Generally, any medical application that uses a biocompatible and/or degradable polymer would find the copolymers of the present invention relevant. Examples of such applications include use as sutures, use as polymer scaffolds for tissue engineering, tissue regeneration, and tissue replacement, use in orthopedic applications, such as fracture fixation and bone replacement/healing, use in dental applications, use as prosthetic devices, use as tissue sealants and surgical sealants for wound healing, use as adhesives, and use as coatings. The present invention contemplates in vivo as well as ex vivo applications.

The applications for active agent delivery systems discussed above wherein it is desirable for the polymers of the present invention to undergo a phase transition when coming in contact with physiological conditions are equally relevant to medical applications wherein the primary purpose is not active agent delivery, but rather those just described, in particular, orthopedic applications, dental applications, and prosthetic devices.

In addition, the degradable crosslinked hydrogel copolymers of the present invention can be used to produce polymeric networks with the desirable physical characteristic of having high mechanical strength. Potential uses of such high strength materials include orthopedic and dental applications, such as those disclosed in U.S. Pat. No. 5,902,599, issued to Anseth et al., entitled "Biodegradable Polymer Networks For Use in Orthopedic an Dental Applications," and as scaffolds for tissue engineering, such as those disclosed in U.S. Pat. No. 6,103,255, issued to Levene et al., entitled "Porous Polymer Scaffolds for Tissue Engineering." Such crosslinked polymer networks of the present invention would provide available unsaturated moieties all along the polymer backbone, rather than only at the ends of the polymer chains, as disclosed in other such polymer systems. Examples of other such crosslinkable polymeric systems are the following: U.S. Pat. Nos. 5,626,863; 5,844,016; 6,051,248; 6,153,211; and 6,201,065; all of the aforementioned patents previously incorporated by reference. In addition, U.S. Pat. No. 5,837,752 issued to Shastri et al., entitled "Semi-Interpenetrating Polymer Networks," incorporated herein by reference, describes relevant applications wherein polymer compositions are injected into the body and polymerized in vivo for use, such as tissue sealants. Alternatively, the polymer compositions are polymerized ex vivo and then implanted into the body, in the form of various shaped articles, such as pins, screws, and hollow tubes, which can be used to repair broken bones. All of the aforementioned patents are incorporated herein by reference.

Conclusion

While various embodiments of the present invention have been described above, it should be understood that they have been presented by way of example only, and not limitation. The present invention is not limited to a particular ethylenically unsaturated epoxide, a particular cyclic ester, a particular hydrophilic segment, copolymer, catalyst or initiating system, nor is the present invention limited to a particular scale or batch size. Thus, the breadth and scope of the present invention should not be limited by any of the above-described exemplary embodiments, but should be defined only in accordance with the following claims and their equivalents.

What is claimed is:

1. A block copolymer comprising a poly(ring-opened cyclic ester-co-ring-opened ethylenically unsaturated epoxide)-block-(hydrophilic segment)-block-poly(ring-opened cyclic ester-co-ring-opened ethylenically unsaturated epoxide) copolymer, wherein the ring-opened ethylenically unsaturated epoxide is randomly distributed ring opened cyclic ester portion of the block copolymer.

2. The block copolymer of claim 1, wherein the hydrophilic segment is amphiphilic.

3. The block copolymer of claim 1, wherein the hydrophilic segment comprises poly(ethylene glycol).

4. The block copolymer of claim 1, wherein the hydrophilic segment comprises a hydroxy-terminated polyethylene oxide/polypropylene oxide block copolymer.

5. The block copolymer of claim 1, wherein the ring-opened cyclic ester is selected from the group consisting of lactide, glycolide, caprolactone, 1,4-dioxan-2-one, cyclic carbonates, caprolactams, and copolymers of the foregoing.

6. The block copolymer of claim 5, wherein the ring-opened cyclic ester is selected from the group consisting of lactide, glycolide, and copolymers of the foregoing.

7. The block copolymer of claim 1, wherein the ethylenically unsaturated epoxide is glycidyl methacrylate.

8. The block copolymer of claim 1, wherein the copolymer is biodegradable.

9. A hydrogel comprising a crosslinked block copolymer, wherein said block copolymer comprises a poly(ring-opened cyclic ester-co-ring-opened ethylenically unsaturated epoxide)-block-(hydrophilic segment)-block-poly(ring-opened cyclic ester-co-ring-opened ethylenically unsaturated epoxide) copolymer, wherein the ring-opened ethylenically unsaturated epoxide is randomly distributed in the ring-opened cyclic ester portion of the block copolymer.

10. The hydrogel of claim 9, wherein the hydrophilic segment is amphiphilic.

11. The hydrogel of claim 9, wherein the hydrophilic segment comprises poly(ethylene glycol).

12. The hydrogel of claim 9, wherein the hydrophilic segment comprises a hydroxy-terminated polyethylene oxide/polypropylene oxide block copolymer.

13. The hydrogel of claim 9, wherein the ring-opened cyclic ester is selected from the group consisting of lactide, glycolide, caprolactone, 1,4-dioxan-2-one, cyclic carbonates, caprolactams, and copolymers of the foregoing.

14. The hydrogel of claim 13, wherein the ring-opened cyclic ester is selected from the group consisting of lactide, glycolide, and copolymers of the foregoing.

15. The hydrogel of claim 9, wherein the ring-opened ethylenically unsaturated epoxide is glycidyl methacrylate.

16. The hydrogel of claim 9, wherein the block copolymer is biodegradable.

17. A method of making a block copolymer, comprising randomly polymerizing an ethylenically unsaturated epoxide and a cyclic ester using a macroinitiator to form a ring-opened cyclic ester-co-ring-opened ethylenically unsaturated epoxide)-block-hydrophilic(macroinitiator)-block-poly(ring-opened cyclic ester-co-ring-opened ethylenically unsaturated epoxide) copolymer, wherein the ring-opened ethylenically unsaturated epoxide is randomly distributed in the ring-opened cyclic ester portion of the block copolymer.

18. The method of claim 17, wherein the ring-opened cyclic ester is selected from the group consisting of lactide, glycolide, caprolactone, 1,4-dioxan-2-one, cyclic carbonates, caprolactams, and copolymers of the foregoing.

19. The method of claim 18, wherein the ring-opened cyclic ester is selected from the group consisting of lactide, glycolide, and copolymers of the foregoing.

20. The method of claim 17, wherein the ethylenically unsaturated epoxide is glycidyl methacrylate.

21. The method of claim 17, wherein the hydrophilic macroinitiator is amphiphilic.

22. The method of claim 17, wherein the hydrophilic macroinitiator comprises poly(ethylene glycol).

23. The method of claim 17, wherein the hydrophilic macroinitiator comprises a hydroxy-terminated polyethylene oxide/polypropylene oxide block copolymer.

24. The method of claim 17, wherein block copolymer is biodegradable.

25. The method of claim 17, further comprising the step of crosslinking said block copolymer to form a hydrogel.

26. The block copolymer formed by the method of claim 17.

27. The crosslinked block copolymer formed by the method of claim 25.

28. A block copolymer comprising a poly(ring-opened cyclic ester-co-ring-opened ethylenically unsaturated epoxide)-block-(hydrophilic sequence-block-poly(ring-opened cyclic ester-co-ring-opened ethylenically unsaturated epoxide) copolymer, wherein the ring-opened ethylenically unsaturated epoxide is randomly distributed in the ring-opened cylic ester portion of the block copolymer having the formula:

wherein HS is a hydrophilic segment; $R_1$=H, alkyl, or substituted alkyl; $R_2$=H, alkyl, or substituted alkyl; $R_3$=H, alkyl, or substituted alkyl; and $R_4$=ethylenically unsaturated group;

and wherein a=1 to 5; x is greater or equal to one; y is greater or equal to one; and z is greater or equal to one.

29. The copolymer of claim 28, wherein the hydrophilic segment is amphiphilic.

30. The block copolymer of claim 28, wherein the hydrophilic segment comprises poly(ethylene glycol).

31. The block copolymer of claim 28, wherein the hydrophilic segment comprises a hydroxy-terminated polyethylene oxide/polypropylene oxide block copolymer.

32. The block copolymer of claim 28, wherein $R_4$= —$CH_2$—O—C(O)—C($CH_3$)=$CH_2$.

33. The block copolymer of claim 28, wherein the copolymer is biodegradable.

34. The block copolymer as in claim 28, wherein the copolymer is crosslinked to form a hydrogel.

35. The hydrogel as in claims 9 or 34, wherein the hydrogel has a water content of at least about 85%.

* * * * *